US010125211B2

(12) United States Patent
Nosaka et al.

(10) Patent No.: US 10,125,211 B2
(45) Date of Patent: Nov. 13, 2018

(54) TIRE MEMBER, HYDROGENATED CONJUGATED DIENE POLYMER, AND POLYMER COMPOSITION

(71) Applicant: JSR CORPORATION, Minato-ku (JP)

(72) Inventors: Naoya Nosaka, Tokyo (JP); Shigeru Abe, Tokyo (JP); Hirofumi Senga, Tokyo (JP); Takumi Adachi, Tokyo (JP); Ryoji Tanaka, Tokyo (JP)

(73) Assignee: JSR CORPORATION, Minato-ku (JP)

( * ) Notice: Subject to any disclaimer, the term of this patent is extended or adjusted under 35 U.S.C. 154(b) by 462 days.

(21) Appl. No.: 14/762,681

(22) PCT Filed: Feb. 27, 2014

(86) PCT No.: PCT/JP2014/054933
§ 371 (c)(1),
(2) Date: Jul. 22, 2015

(87) PCT Pub. No.: WO2014/133097
PCT Pub. Date: Sep. 4, 2014

(65) Prior Publication Data
US 2015/0361210 A1    Dec. 17, 2015

(30) Foreign Application Priority Data
Feb. 28, 2013    (JP) .................................. 2013-039072

(51) Int. Cl.
| C08C 19/02 | (2006.01) |
| C08F 299/02 | (2006.01) |
| C08C 19/44 | (2006.01) |
| C08L 15/00 | (2006.01) |
| B60C 1/00 | (2006.01) |
| C08K 3/36 | (2006.01) |
| C08C 19/20 | (2006.01) |
| C08C 19/22 | (2006.01) |
| C08C 19/24 | (2006.01) |
| C08C 19/25 | (2006.01) |
| C08K 3/04 | (2006.01) |

(52) U.S. Cl.
CPC .......... *C08F 299/02* (2013.01); *B60C 1/0016* (2013.01); *B60C 1/0025* (2013.01); *C08C 19/02* (2013.01); *C08C 19/20* (2013.01); *C08C 19/22* (2013.01); *C08C 19/24* (2013.01); *C08C 19/25* (2013.01); *C08C 19/44* (2013.01); *C08K 3/36* (2013.01); *C08L 15/00* (2013.01); *C08K 3/04* (2013.01)

(58) Field of Classification Search
CPC ................... C08F 299/02; C08C 19/02; C08C 19/20–19/29; C08C 19/44
See application file for complete search history.

(56) References Cited

U.S. PATENT DOCUMENTS

| 8,058,357 B2 * | 11/2011 | Randall ................. B60C 1/0016 |
| | | 525/331.9 |
| 9,085,653 B2 | 7/2015 | Yamada et al. |
| 2003/0100683 A1 | 5/2003 | Toyoizumi et al. |
| 2004/0254301 A1 | 12/2004 | Tsukimawashi et al. |
| 2004/0260002 A1 | 12/2004 | Robert et al. |
| 2006/0089445 A1 | 4/2006 | Gandon-Pain |
| 2008/0103261 A1 | 5/2008 | Tanaka et al. |
| 2009/0030138 A1 | 1/2009 | Suzuki et al. |
| 2009/0264591 A1 | 10/2009 | Sano et al. |
| 2010/0016496 A1 | 1/2010 | Tanaka et al. |
| 2010/0130669 A1 | 5/2010 | Higuchi et al. |
| 2011/0319519 A1 | 12/2011 | Sone et al. |

FOREIGN PATENT DOCUMENTS

| CN | 101379125 A | 3/2009 |
| CN | 101528814 A | 9/2009 |
| EP | 1 245 585 A2 | 10/2002 |
| EP | 1 245 585 A3 | 10/2002 |
| EP | 1 293 535 A2 | 3/2003 |
| EP | 1 293 535 A3 | 3/2003 |
| EP | 1 873 168 A1 | 1/2008 |
| EP | 1 980 589 A1 | 10/2008 |
| EP | 2 055 737 A1 | 5/2009 |
| EP | 2 075 278 A1 | 7/2009 |
| EP | 2 138 537 A1 | 12/2009 |
| EP | 2 154 192 A1 | 2/2010 |
| EP | 2 407 507 A1 | 1/2012 |
| JP | 2003-246817 A | 9/2003 |
| JP | 2005-507441 A | 3/2005 |
| JP | 2008-248203 A | 10/2008 |
| JP | 2009-132907 A | 6/2009 |
| RU | 2 337 923 C2 | 11/2008 |
| RU | 2 425 845 C2 | 8/2011 |
| RU | 2 470 960 C2 | 12/2012 |
| WO | 2009/060931 A1 | 5/2009 |

(Continued)

OTHER PUBLICATIONS

International Search Report dated Apr. 15, 2014 in PCT/JP2014/054933 filed Feb. 27, 2014.

(Continued)

*Primary Examiner* — Peter D. Mulcahy
(74) *Attorney, Agent, or Firm* — Oblon, McClelland, Maier & Neustadt, L.L.P.

(57) ABSTRACT

Provided is a tire member which is satisfactory in low fuel consumption performance and exhibits higher strength and more excellent abrasion resistance as compared with conventional ones. The tire member is a tire member obtained by subjecting a composition containing a hydrogenated conjugated diene polymer and a crosslinking agent to a crosslinking treatment, wherein the hydrogenated conjugated diene polymer is a hydrogenated product of a conjugated diene polymer that has a structural unit derived from butadiene and has a functional group at one end or both ends and the functional group is one or more groups selected from the group consisting of an amino group, an imino group, a pyridyl group, a phosphino group, a thiol group, and a hydrocarbyloxysilyl group.

20 Claims, No Drawings

(56) References Cited

OTHER PUBLICATIONS

Office Action dated Nov. 24, 2015 in Japanese Patent Application No. 2015-503028 with English translation.
Extended European Search Report dated Apr. 4, 2016 in Patent Application No. 14757378.6.
Combined Chinese Office Action and Search Report dated Apr. 22, 2016 in Patent Application No. 201480010611.2 (with partial English language translation and English translation of categories of cited documents).
Office Action dated Nov. 1, 2016 in Chinese Patent Application No. 201480010611.2 (with unedited computer generated English translation).
Combined Search Report and Office Action dated Mar. 22, 2017 in Russian Patent Application No. 2015140984/05(063124) (with English translation).
Office Action dated Aug. 8, 2018 in the Thai Patent Application No. 1501004941 (w/ English translation thereof).

\* cited by examiner

TIRE MEMBER, HYDROGENATED CONJUGATED DIENE POLYMER, AND POLYMER COMPOSITION

TECHNICAL FIELD

The present invention relates to a tire member, a hydrogenated conjugated diene polymer, and a polymer composition.

BACKGROUND ART

In pneumatic tires, it is required to improve low fuel consumption performance. In order to meet such a requirement, an end-modified diene rubber has been developed (see the following Patent Document 1). Since the end-modified diene rubber has good compatibility with a filler as a reinforcing agent, such as carbon black or silica, as compared with common unmodified diene rubbers, the low fuel consumption performance can be improved with suppressing heat generation.

On the other hand, since not only the low fuel consumption performance but also extension of tire life contribute the reduction of environmental burden, a material having high strength and excellent abrasion resistance has been requested.

RELATED ART DOCUMENT

Patent Document

Patent Document 1: JP-A-61-103904

SUMMARY OF INVENTION

Problems to be Solved by the Invention

The present invention has been made in consideration of the above and an object of the invention is to provide a tire member which is satisfactory in low fuel consumption performance and exhibits higher strength and more excellent abrasion resistance as compared with conventional ones.

Means for Solving the Problems

As a result of extensive studies for solving the problems of the conventional technologies as described above, the present inventors have found that the above problems can be solved by using a hydrogenated conjugated diene polymer that is a hydrogenated product of a polymer obtained by polymerizing monomer(s) including butadiene, and thus they have solved the invention. Specifically, the invention provides the following tire member, hydrogenated conjugated diene polymer, and polymer composition.

[1] A tire member obtained by subjecting a composition containing a hydrogenated conjugated diene polymer and a crosslinking agent to a crosslinking treatment, wherein the hydrogenated conjugated diene polymer is a hydrogenated product of a conjugated diene polymer that has a structural unit derived from butadiene and has a functional group at one end or both ends and the functional group is one or more groups selected from the group consisting of an amino group, an imino group, a pyridyl group, a phosphino group, a thiol group, and a hydrocarbyloxysilyl group.

[2] A hydrogenated conjugated diene polymer, which is a hydrogenated product of a conjugated diene polymer that has a structural unit derived from butadiene and has a functional group at one end or both ends of the polymer chain and in which the functional group is at least one group selected from the group consisting of an amino group, an imino group, a pyridyl group, a phosphino group, a thiol group, and a hydrocarbyloxysilyl group.

[3] A polymer composition for tire member formation, which contains the hydrogenated conjugated diene polymer of [2] above and a crosslinking agent.

Effects of the Invention

According to the invention, when a specific hydrogenated conjugated diene polymer having a structural unit derived from butadiene is used, it is possible to obtain a vulcanized rubber capable of obtaining a tire member exhibiting low fuel consumption performance, high strength and low abrasion.

EMBODIMENTS FOR CARRYING OUT THE INVENTION

The following will describe matters relating to implementation of the present invention in detail.

<Conjugated Diene Polymer>

The conjugated diene polymer before hydrogenation, which is used for the production of the hydrogenated conjugated diene polymer of the invention, may be a homopolymer of 1,3-butadiene, may be a random copolymer of 1,3-butadiene and a conjugated diene compound other than 1,3-butadiene, may be a random copolymer of 1,3-butadiene and an aromatic vinyl compound, or may be a random copolymer of 1,3-butadiene, a conjugated diene compound other than 1,3-butadiene, and an aromatic vinyl compound. Of these, as the conjugated diene polymer, a polymer obtained by polymerizing monomers including 1,3-butadiene and an aromatic vinyl compound is preferred in view of high living properties in an anionic polymerization. Incidentally, in the invention, the term that the conjugated diene polymer before hydrogenation is random copolymerization means that a chain composed of the structural units derived from the aromatic vinyl compound ranging in an amount of 8 or more units is contained in a ratio of 10% by mass or less relative to the whole of the structural units derived from the aromatic vinyl compound which is contained in the conjugated diene polymer before hydrogenation. The conjugated diene compound other than 1,3-butadiene is not particularly limited as long as it is copolymerizable with 1,3-butadiene and the aromatic vinyl compound. In the invention, the term "conjugated diene compound" is used as a collective concept of 1,3-butadiene and, as an optional component, the conjugated diene compound other than 1,3-butadiene.

Here, the content of the chain composed of the structural units derived from the aromatic vinyl compound ranging in an amount of 8 or more units can be calculated as a ratio of the integrated value of the range of the following (a) relative to the sum of the integrated values of individual chemical shift ranges of the following (a) to (c) in $^1$H-NMR spectrum of a conjugated diene polymer before or after hydrogenation measured using deuterated chloroform as a solvent. For example, in the case where the aromatic vinyl is styrene, the ratio of styrene can be calculated by determining the ratio of the integrated value of the range of (a) relative to the sum of the integrated values of the individual ranges of (a) to (c) and multiplying the ratio by 2.5. Thereby, a state of the chain of the structural units derived from the aromatic vinyl compound can be grasped.

(a) a chain of 8 or more of the aromatic vinyl compounds: $6.00 \leq S < 6.68$
(b) a chain of 2 to 7 of the aromatic vinyl compounds: $6.68 \leq S < 6.89$
(c) a short chain of the aromatic vinyl compounds: $6.89 \leq S \leq 8.00$ In the copolymer of the conjugated diene compound and the aromatic vinyl compound, the amount of the aromatic vinyl compound to be used is preferably from 10 to 50% by weight, and more preferably from 15 to 40% by mass relative to the total amount of the monomers to be used in the polymerization, from the standpoint of good balance between low hysteresis loss properties and wet skid resistance of the polymer obtained by the crosslinking treatment. When the content of the aromatic vinyl compound is controlled within the above range, it becomes possible to achieve both of productivity and strength.

As the conjugated diene compound to be used in the polymerization of the conjugated diene compound or the conjugated diene compound and the aromatic vinyl compound, there may be mentioned 1,3-butadiene that is an essential component and also, as the conjugated diene compound other than 1,3-butadiene, for example, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene, and the like. Incidentally, the conjugated diene compounds may be used singly or two or more thereof may be used in combination.

Moreover, as the aromatic vinyl compound, there may be, for example, mentioned styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinylpyridine, diphenylethylene, tertiary amino group-containing diphenylethylene such as 1-(4-N,N-dimethylaminophenyl)-1-phenylethylene, and the like. Of these, styrene and α-methylstyrene are particularly preferable as the aromatic vinyl compound. The aromatic vinyl compounds may be used singly or two or more thereof may be used in combination.

Incidentally, the conjugated diene compounds and the aromatic vinyl compounds exemplified in the above all have the similar effects in view that it is possible to obtain a conjugated diene polymer having an active end. Therefore, even one not described in Examples to be described later can be used in the invention.

At the time of polymerization, a monomer other than the conjugated diene compounds and aromatic vinyl compounds may be used. Examples of the other monomer include acrylonitrile, methyl(meth)acrylate, ethyl(meth)acrylate, hydroxyethyl(meth)acrylate, and the like. The amount of the other monomer to be used is preferably 40% by mass or less, more preferably 30% by mass or less, and further preferably 20% by mass or less based on the total amount of the monomers to be used in the polymerization.

The conjugated diene polymer in the invention can be produced by performing polymerization using, as monomer(s), the conjugated diene compound and, if necessary, the aromatic vinyl compound and the other monomer(s). As a polymerization method, any one of a solution polymerization method, a gas-phase polymerization method, and a bulk polymerization method may be used but the solution polymerization method is particularly preferable. Furthermore, as a polymerization type, either of a batch type and a continuous type may be used.

In the case where the solution polymerization method is used, as one example of specific polymerization methods, there may be mentioned a method of subjecting the monomer(s) including the conjugated diene compound to anionic polymerization in an organic solvent in the presence of a polymerization initiator and a randomizer which is used as needed.

As the polymerization initiator, at least either of an alkali metal compound and an alkaline earth metal compound can be used. As the alkali metal compound and the alkaline earth metal compound, those usually used as polymerization initiators can be used, and examples thereof include alkyllithiums such as methyllithium, ethyllithium, n-propyllithium, n-butyllithium, sec-butyllithium, and t-butyllithium, 1,4-dilithiobutane, phenyllithium, stilbenelithium, naphthyllithium, 1,3-bis(1-lithio-1,3-dimethylpentyl)benzene, 1,3-phenylene-bis(3-methyl-1-phenylpentylidene)dilithium, naphthylsodium, naphthylpotassium, di-n-butylmagnesium, di-n-hexylmagnesium, ethoxypotassium, calcium stearate, and the like. Of these, lithium compounds are preferable.

Moreover, the polymerization reaction may be performed in the presence of a compound (R) obtained by mixing at least either of the alkali metal compound and the alkaline earth metal compound and a compound (B1) having a functional group that interacts with silica. By performing the polymerization in the presence of the compound (R), a functional group having interaction with silica can be introduced into a polymerization initiation end of the conjugated diene polymer. Herein, "interaction" means that a covalent bond is formed between molecules or an intermolecular force weaker than a covalent bond (e.g., an electromagnetic force working between molecules, such as ion-dipole interaction, dipole-dipole interaction, a hydrogen bond, Van der Waals force) is formed. Moreover, the "functional group that interacts with silica" means a group having at least one atom that interacts with silica, such as a nitrogen atom, a sulfur atom, a phosphorus atom, or an oxygen atom.

In particular, the compound (R) is preferably a reaction product of a lithium compound such as an alkyllithium with a nitrogen-containing compound such as a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinane, and the like. Incidentally, in the case of performing the polymerization in the presence of the compound (R), the compound (R) may be prepared by mixing the alkali metal compound or the alkaline earth metal compound with the compound (B1) beforehand and then the prepared compound (R) may be added into a polymerization system to perform the polymerization. Alternatively, the compound (R) may be prepared by adding the alkali metal compound or the alkaline earth metal compound and the compound (B1) into a polymerization system and mixing the both in the polymerization system and then the polymerization may be performed.

The randomizer can be used for the purpose of adjustment and the like of the content ratio of vinyl bonds (1,2-bonds and 3,4-bonds) (vinyl content). Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, tetramethylethylenediamine, and the like. They may be used singly or two or more thereof may be used in combination.

The organic solvent to be used in the polymerization may be any one as long as it is a reaction-inactive organic solvent. For example, an aliphatic hydrocarbon, an alicyclic hydrocarbon, an aromatic hydrocarbon, or the like can be used. In particular, hydrocarbons having 3 to 8 carbon atoms are preferable. Of these, a hydrocarbon having 3 to 8 carbon atoms is preferable, and specific examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. The organic solvents may be used singly or two or more thereof may be used in combination.

In the case where the solution polymerization is used, the monomer concentration in a reaction solvent is preferably from 5 to 50% by mass and more preferably from 10 to 30% by mass, from the viewpoint of maintaining a balance between productivity and easiness of polymerization control. The temperature of the polymerization reaction is preferably from −20 to 150° C., more preferably from 0 to 120° C., and particularly preferably from 20 to 100° C. Moreover, the polymerization reaction is preferably conducted under a pressure enough to keep the monomer(s) substantially in a liquid phase. Such a pressure can be obtained by a method of pressurizing the inside of a reactor with a gas inactive to the polymerization reaction, or a similar method.

As above, a conjugated diene polymer having an active end can be obtained. The weight-average molecular weight (Mw) of the conjugated diene polymer in terms of polystyrene by gel permeation chromatography (GPC) is preferably from $1.0 \times 10^5$ to $2.0 \times 10^6$. When Mw is smaller than $1.0 \times 10^5$, the low fuel consumption performance and abrasion resistance tend to decrease in the crosslinked polymer obtained using the polymer composition. When Mw is larger than $2.0 \times 10^6$, workability of the polymer composition tend to decrease. Mw is more preferably from $1.2 \times 10^5$ to $1.5 \times 10^6$ and further preferably from $1.5 \times 10^5$ to $1.0 \times 10^6$.

Moreover, the 1,2-vinyl content in the structural unit derived from butadiene is preferably from 5 to 70% by mass, more preferably 10 to 60% by mass, and further preferably from 25 to 60% by mass. When the 1,2-vinyl content is less than 5% by mass, the grip properties are prone to decrease exceedingly and, when the content exceeds 70% by mass, the abrasion resistance tends to get worse. Incidentally, the vinyl content is a value measured by $^1$H-NMR.

The conjugated diene polymer obtained by the present polymerization step may have a polyisoprene block at one end or both ends thereof. When it has the polyisoprene block, it becomes possible to vulcanize a polymer having a high hydrogenation rate efficiently. The ratio of 1,4-bond/3,4-bond in the polyisoprene block is preferably in the range of 60/40 to 98/2. When the ratio of 1,4-bond/3,4-bond falls within the range, it becomes possible to achieve both of the flexibility and crosslinking efficiency of the crosslinked rubber.

<Modification Step>

A functional group that interacts with silica can be introduced into a polymerization termination end of the conjugated diene polymer by a step of reacting the active end of the conjugated diene polymer obtained by the above polymerization step with a compound (B2) having a functional group that interacts with silica. Incidentally, in the invention, the end means a portion, which exists at an end of the molecular chain, other than the structure derived from the monomer having a carbon-carbon double bond.

The conjugated diene polymer to be used in the modification reaction (hereinafter, also referred to as end modification reaction) may be one in which the polymerization initiation end is unmodified or modified as long as the polymer has an active end. Moreover, the compound (B2) is not particularly limited as long as it has a functional group that interacts with silica and is capable of reacting with the polymerization active end. Preferable specific examples of the compound (B2) include, for example, (I) a compound (B2-1) represented by the following formula (1):

[Chem 1]

wherein $A^1$ is a monovalent functional group which has at least one atom selected from the group consisting of a nitrogen atom, a phosphorus atom, and a sulfur atom, does not have an active hydrogen, and binds to $R^5$ with a nitrogen atom, a phosphorus atom, or a sulfur atom; $R^3$ and $R^4$ are each a hydrocarbyl group, $R^5$ is a hydrocarbylene group, and n is an integer of 0 to 2, provided that, in the case where $R^3$ and $R^4$ exist in plurality, a plurality of $R^3$'s and $R^4$'s may be each the same or different;

(II) a compound (B2-2) having, in the molecule, at least one functional group (x1) selected from the group consisting of a cyclic ether group, (thio)carbonyl group, and an iso(thio)cyanate group and at least one group (x2) different from the functional group (x1), which has at least one atom selected from the group consisting of a nitrogen atom, a phosphorus atom, an oxygen atom, and a sulfur atom (provided that at least one of the nitrogen atom, the phosphorus atom, and the sulfur atom may be protected with a tri-substituted hydrocarbylsilyl group) and does not have an active hydrogen;

(III) a compound (B2-3) having two or more iso(thio)cyanate groups in the molecule;
and the like. As the compound (B2), they may be used either singly or as a combination of two or more thereof. Incidentally, herein, the (thio)carbonyl group means a carbonyl group and a thiocarbonyl group and the iso(thio)cyanate group means an isocyanate group and an isothiocyanate group.

In the above formula (1), the hydrocarbyl group of $R^3$ and $R^4$ is preferably a linear or branched alkyl group having 1 to 20 carbon atoms, a cycloalkyl group having 3 to 20 carbon atoms, or an aryl group having 6 to 20 carbon atoms.

$R^5$ is preferably a linear or branched alkanediyl group having 1 to 20 carbon atoms, a cycloalkylene group having 3 to 20 carbon atoms, or an arylene group having 6 to 20 carbon atoms.

n is preferably 0 or 1 from the viewpoint of increasing the reactivity with the conjugated diene polymer, A$^1$ has at least one atom (hereinafter, also referred to as a specific atom) selected from the group consisting of a nitrogen atom, a phosphorus atom, and a sulfur atom and binds to R$^5$ with the specific atom. The specific atom does not bind to any active hydrogen and, for example, may be protected with a tri-substituted hydrocarbylsilyl group or the like. Incidentally, the "active hydrogen" herein means a hydrogen atom bound to an atom other than a carbon atom, and preferably means one having lower bond energy than that of a carbon-hydrogen bond of polymethylene.

In particular, A$^1$ is preferably a group capable of becoming an onium ion by the action of an onium salt-forming agent. When the compound (B2) has such a group (A$^1$), excellent shape-retaining properties can be imparted to the modified conjugated diene polymer.

Specific examples of A$^1$ include a nitrogen-containing group in which two hydrogen atoms of a primary amino group are substituted with two protective groups, a nitrogen-containing group in which one hydrogen atom of a secondary amino group is substituted with one protective group, a tertiary amino group, an imino group, a pyridyl group, a phosphorus-containing group in which two hydrogen atoms of a primary phosphino group are substituted with two protective groups, a phosphorus-containing group in which one hydrogen atom of a secondary phosphino group is substituted with one protective group, a tertiary phosphino group, a sulfur-containing group in which one hydrogen atom of a thiol group is substituted with one protective group, and the like. Of these, from the viewpoint of good affinity to silica, A$^1$ is preferably a group having a nitrogen atom. Incidentally, the "protective group" is a functional group that converts A$^1$ into a functional group inactive to the polymerization active end and, for example, tri-substituted hydrocarbylsilyl group and the like may be mentioned.

As specific examples of the above compound (B2-1), there may be mentioned, as compounds having the nitrogen-containing group in which two hydrogen atoms of a primary amino group are substituted with two protective groups, the nitrogen-containing group in which one hydrogen atom of a secondary amino group is substituted with one protective group, or the tertiary amino group and an alkoxysilyl group, for example, N,N-bis(trimethylsilyl)aminopropyltrimethoxysilane, N,N-bis(trimethylsilyl)aminopropylmethyldiethoxysilane, N,N',N'-tris(trimethylsilyl)-N-(2-aminoethyl)-3-aminopropyltriethoxysilane, 3-(4-trimethylsilyl-1-piperazino)propylmethyldimethoxysilane, and the like.

As compounds having the imino group or the pyridyl group and the alkoxysilyl group, there may be mentioned N-(1,3-dimethylbutylidene)-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl compounds, methyldiethoxysilyl compounds, and ethyldimethoxysilyl compounds corresponding to these triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, and compounds in which the alkyl group or the alkanediyl group in the above-mentioned compounds is replaced with an alkyl group having 1 to 6 carbon atoms or an alkanediyl group having 1 to 6 carbon atoms, respectively, and the like.

As the compounds having a phosphorus-containing group in which two hydrogen atoms of a primary phosphino group are substituted with two protective groups, the phosphorus-containing group in which one hydrogen atom of a secondary phosphino group is substituted with one protective group, the tertiary phosphino group, or the sulfur-containing group in which one hydrogen atom of a thiol group is substituted with one protective group and the alkoxysilyl group, there may be mentioned P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphosphinopropylmethyldimethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, compounds in which the alkyl group or the alkanediyl group in the above-mentioned compounds is replaced with an alkyl group having 1 to 6 carbon atoms or an alkanediyl group having 1 to 6 carbon atoms, respectively, and the like. Besides, as the compound having an iso(thio)cyanate group, 3-isocyanatopropyltrimethoxysilane, 3-isocyanatopropyltriethoxysilane, and the like may be mentioned.

In the compound (B2-2), the group (x2) is preferably a group containing a nitrogen atom that does not bind to an active hydrogen. Specific examples thereof include, as compounds having the cyclic ether group, for example, epoxyamine compounds such as tetraglycidyl-1,3-bisaminomethylcyclohexane; as compounds having the (thio)carbonyl group, for example, 4-aminoacetophenones such as 4-N,N-dimethylbenzoacetophenone; bis(dihydrocarbylaminoalkyl)ketones such as 1,7-bis(methylethylamino)-4-heptanone; dihydrocarbylaminoalkyl(meth)acrylates such as 2-dimethylaminoethyl acrylate; hydrocarbylimidazolidinones such as 1,3-dimethyl-2-imidazolidinone; N-hydrocarbylpyrrolidones such as 1-phenyl-2-pyrrolidon; N-hydrocarbylcaprolactams such as N-methyl-ε-caprolactam; N-dihydrocarbylformamides such as N,N-diethylformamide; N,N-dihydrocarbylacetamides such as N,N-dimethylacetamide; (meth)acrylamides such as N,N-dimethylacrylamide; and the like; as compounds having the iso(thio)cyanate group, for example, 3-isocyanatopropyltrimethoxysilane and the like.

As the compound (B2-3), there may be, for example, mentioned 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl)thiophosphate, xylene diisocyanate, benzene-1,2,4-triisocyanate, naphthalene-1,2,5,7-tetraisocyanate, 1,4-phenylene diisothiocyanate, and the like.

As the compound (B2), in view of strong affinity to silica, it is preferable to use the compound (B2-1), particularly. Incidentally, in the case where the silane compound (B2-1) is used, for the purpose of adjusting the Mooney viscosity of the modified conjugated diene polymer, silicon tetrachloride or an epoxy-containing compound (e.g., tetraglycidyl-1,3-bisaminomethylcyclohexane or the like) may be used together with the silane compound (B2-1). In view that it is possible to obtain a modified conjugated diene polymer having a modified polymerization termination end, the compounds (B2) exemplified in the above all have similar effects. Therefore, even one not described in Examples to be described later can be used in the invention. Incidentally, a structure represented by the following formula (1-1) is introduced into the polymer end by the reaction of the compound represented by the above formula (1) with the modified conjugated diene polymer.

[Chem 2]

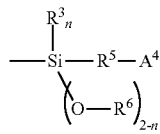

(1-1)

wherein $R^6$ is a hydrogen atom or a hydrocarbyl group and $R^6$'s present in plurality may be the same or different; $A^4$, $R^3$, $R^5$, and n have the same meanings as $A^1$, $R^3$, $R^5$, and n in the above formula (1).

The end modification reaction can be performed, for example, as a solution reaction. The solution reaction may be performed with using an unreacted monomer-containing solution after completion of the polymerization reaction in the polymerization step or may be performed after the conjugated diene polymer contained in the solution is isolated and dissolved in a suitable solvent such as cyclohexane. Moreover, the end modification reaction may be performed using either a batch system or a continuous system. At this time, a method of adding the compound (B2) is not particularly limited, and there may be mentioned a method of batch addition, a method of split addition, a method of continuous addition, and the like.

The amount of the compound (B2) to be used in the end modification reaction may be appropriately set depending on the kind of the compound to be used in the reaction but is preferably 0.1 molar equivalents or more and more preferably 0.3 molar equivalents or more, based on the metal atom which is contained in the polymerization initiator and participates the polymerization reaction. When the amount is controlled to 0.1 molar equivalents or more, the modification reaction can be allowed to proceed sufficiently and dispersibility of silica can be suitably improved.

The temperature of the end modification reaction is usually the same as the above-described polymerization reaction temperature, and it is preferably from −20 to 150° C., more preferably from 0 to 120° C., and particularly preferably from 20 to 100° C. When the temperature of the modification reaction is low, the viscosity of the modified conjugated diene polymer tends to increase. On the other hand, when the temperature of the modification reaction is high, the polymerization active end is prone to be deactivated. The reaction time of the modification reaction is preferably from 1 minute to 5 hours and more preferably from 2 minutes to 1 hour.

<Hydrogenation Reaction>

The hydrogenated conjugated diene polymer of the invention can be obtained by hydrogenating the conjugated diene polymer obtained in the above. As methods and conditions for the hydrogenation reaction, it is possible to use any methods and conditions as long as a polymer having a desired hydrogenation rate is obtained. Examples of the hydrogenation methods include a method of using a catalyst containing an organometallic compound of titanium as a hydrogenation catalyst, a method of using a catalyst composed of an organic compound of iron, nickel, or cobalt and an organometallic compound such as an alkylaluminum, a method of using an organic complex of an organometallic compound of ruthenium or rhodium, a method of using a catalyst obtained by supporting a metal such as palladium, platinum, ruthenium, cobalt, or nickel on a support such as carbon, silica, or alumina, and similar methods. Of various methods, a method of hydrogenation under mild conditions of low pressure and low temperature using a homogeneous catalyst composed of an organometallic compound of titanium alone or the compound and an organometallic compound of lithium, magnesium, or aluminum (JP-B-63-4841, JP-B-1-37970) is industrially preferable and also is suitable for the purpose of the invention since hydrogenation selectivity to the double bond of butadiene is also high.

The hydrogenation is carried out in a solvent that is inactive to the catalyst and is capable of solubilizing the conjugated diene polymer. A preferable solvent is an aliphatic hydrocarbon such as n-pentane, n-hexane, or n-octane, an alicyclic hydrocarbon such as cyclohexane or cyclohexane, an aromatic hydrocarbon such as benzene or toluene, an ether such as diethyl ether or tetrahydrofuran singly or as a mixture containing them as a main component.

The hydrogenation reaction is generally carried out by keeping a polymer at a predetermined temperature under a hydrogen or an inert atmosphere, adding a hydrogenation catalyst under stirring or under non-stirring, and subsequently introducing a hydrogen gas to achieve pressurization to a predetermined pressure. The inert atmosphere means an atmosphere, such as helium, neon, or argon, which does not react with any materials that participate the hydrogenation reaction. The air and oxygen are not preferable since they oxidize the catalyst to invite deactivation of the catalyst. Also, nitrogen is not preferable since it acts as a catalyst poison at the time of the hydrogenation reaction to decrease hydrogenation activity. Particularly, the inside of a hydrogenation reaction vessel is suitably an atmosphere of a hydrogen gas alone.

In the hydrogenation reaction process for obtaining the hydrogenated conjugated diene polymer, any of a batch process, a continuous process, and a combination thereof can be used. Moreover, in the case where a titanocene diaryl-based compound is used as a hydrogenation catalyst, it may be added alone to the reaction solution as it is or may be added as a solution of an inactive organic solvent. As the inactive organic solvent to be used in the case where the catalyst is used as a solution, the above various solvents which do not react with any materials that participate the hydrogenation reaction can be used. Preferably, the solvent is the same solvent as the solvent to be used in the hydrogenation reaction. Also, the amount of the catalyst to be added is from 0.02 to 20 mmol per 100 g of the polymer before hydrogenation.

A preferable method for obtaining the hydrogenated conjugated diene polymer constituting the invention is a method of subjecting a conjugated diene polymer before hydrogenation to solution polymerization using an organolithium catalyst and using the resulting polymer solution in the next hydrogenation reaction without further treatment, which method is industrially useful. The hydrogenated conjugated diene polymer constituting the invention is obtained by removing the solvent from the solution obtained in the above and isolating the polymer.

With regard to the hydrogenation rate of the hydrogenated conjugated diene polymer of the invention, the hydrogenation rate of the structural unit derived from butadiene is preferably 70% or more. When the hydrogenation rate is controlled to 70% or more, the hydrogenated copolymer having higher strength can be obtained. For the reason, the hydrogenation rate is more preferably 80% or more and further preferably 90% or more. Incidentally, the hydrogenation rate can be measured by $^1$H-NMR.

The polymer composition for tire member formation according to the invention contains the hydrogenated conjugated diene polymer and a crosslinking agent. The content ratio of the hydrogenated conjugated diene polymer in the polymer composition is preferably 20% by mass or more, more preferably 30% by mass or more, and further preferably 40% by mass or more relative to the total amount of the polymer composition. As the crosslinking agent, sulfur, sulfur halides, organic peroxides, quinone dioximes, organic polyvalent amine compounds, and alkylphenol resins having a methylol group, and the like may be mentioned and usually, sulfur is used. The amount of sulfur to be blended is preferably from 0.1 to 5 parts by mass, and more preferably from 0.5 to 3 parts by mass based on 100 parts by mass of the total amount of the polymer components contained in the polymer composition.

Into the polymer composition, in addition to the hydrogenated conjugated diene polymer, the other rubber component may be blended. The kind of the rubber component is not particularly limited and there may be mentioned butadiene rubber (BR, e.g., high cis BR having 90% or more of cis-1,4-bond, syndiotactic-1,2-polybutadiene (SPB)-containing BR, etc.), styrene-butadiene rubber (SBR), natural rubber (NR), isoprene rubber (IR), styrene-isoprene copolymer rubber, butadiene-isoprene copolymer rubber, and the like. More preferred are BR and SBR.

In the polymer composition, as a filler, various reinforcing fillers such as carbon black, silica, clay, and calcium carbonate can be used. Preferred is carbon black, silica, or a combined use of carbon black and silica. The total amount of silica and carbon black in the polymer composition is preferably from 20 to 130 parts by mass and more preferably from 25 to 110 parts by mass based on 100 parts by mass of the total amount of the polymer components contained in the polymer composition.

Into the polymer composition, in addition to the above-described components, various additives which are commonly used in the rubber composition for tires, such as antiaging agents, zinc white, stearic acid, softeners, sulfur, and vulcanizing accelerators can be blended.

The hydrogenated conjugated diene polymer composed of the above can be suitably used as a material for tire treads and side walls, owing to high strength.

The production of the tire can be performed according to a usual method. Namely, the polymer composition for tire member formation is formed into a side wall rubber by mixing the composition in a mixing machine such as a roll or a mixer and subjecting sheet-shaped one to vulcanization and shaping with disposing it on the outside of a carcass according to a usual method, thereby obtaining a pneumatic tire.

EXAMPLES

The present invention will be specifically described below on the basis of Examples but the invention should not be construed as being limited to these Examples. Incidentally, "parts" and "%" in Examples and Comparative Examples are by mass basis unless otherwise specified. Measuring methods of various physical property values are shown in the following.

[Bound styrene content (%)]: it was determined by $^1$H-NMR of 500 MHz.

[Vinyl content (%)]: it was determined by $^1$H-NMR of 500 MHz.

[Glass transition temperature (° C.)]: it was measured in accordance with ASTM D3418.

[Molecular weight before modification]: it was determined in terms of polystyrene from the retention time corresponding to the maximum peak point on a GPC curve obtained using gel permeation chromatography (GPC) (HLC-8120GPC (trade name (manufactured by Tosoh Corporation)).

(Conditions for GPC)

Column: trade name "GMHXL" (manufactured by Tosoh Corporation), 2 columns

Column temperature: 40° C.

Mobile phase: tetrahydrofuran

Flow rate: 1.0 ml/minute

Sample concentration: 10 mg/20 ml

[Mooney viscosity (ML1+4, 100° C.)]: It was determined in accordance with JIS K6300-1 using an L-rotor under conditions of preheating for 1 minute, a rotor operation time of 4 minutes, and a temperature of 100° C.

[Hydrogenation rate (%)]: It was determined by $^1$H-NMR of 500 MHz.

[Ratio of styrene long chain (% by mass)]: A styrene long chain ratio θst that is the ratio of the chain composed of the styrene structural units ranging 8 or more units relative to the all styrene structural units in the polymer was determined as follows. From $^1$H-NMR spectrum of 500 MHz measured using deuterated chloroform as a solvent, a ratio of the integrated value Σ(a) of the range of (a) relative to the sum Σ(a,b,c) of the integrated values of individual chemical shift ranges of the following (a) to (c) was determined, the ratio was multiplied by 2.5, and the resulting value was taken as the content ratio θst of the styrene long chain (the following numerical formula (1)).

(a) a chain of 8 or more of the aromatic vinyl compounds: 6.00≤S<6.68

(b) a chain of 2 to 7 of the aromatic vinyl compounds: 6.68≤S<6.89

(c) a short chain of the aromatic vinyl compounds: 6.89≤S≤8.00

$$\theta st[\text{wt \%}]=(\Sigma(a)/\Sigma(a,b,c))\times 2.5 \qquad (1)$$

Examples and Comparative Examples of Method for Producing Hydrogenated Conjugated Diene Block Polymers <Production of Hydrogenation Catalysts>

Hydrogenation catalysts (catalysts A and B) were produced by the following methods.

Production Example 1

Catalyst A

A three-neck flask having a volume of 1 L, equipped with a stirrer and a dropping funnel, was subjected to replacement with dry nitrogen and 200 ml of anhydrous tetrahydrofuran and 0.2 mol of tetrahydrofurfuryl alcohol were added thereto. Thereafter, an n-butyllithium (hereinafter, also referred to as "n-BuLi")/cyclohexane solution (0.2 mol) was added dropwise into the three-neck flask at 15° C. to perform a reaction, thereby obtaining a tetrahydrofuran solution of tetrahydrofurfuryloxylithium.

Then, a three-neck flask having a volume of 1 L, equipped with a stirrer and a dropping funnel, was subjected to replacement with dry nitrogen and 49.8 g (0.2 mol) of bis(n5-cyclopentadienyl)titanium dichloride and 250 ml of anhydrous tetrahydrofuran were added thereto. The tetrahydrofuran solution of tetrahydrofurfuryloxylithium obtained by the above-described method was added dropwise thereto over a period of about 1 hour at room temperature under stirring. After about 2 hours, a reddish brown solution was filtrated and an undissolved portion was washed with dichloromethane.

Thereafter, the filtrate and the washing solution were combined and the solvents were removed under reduced pressure, thereby obtaining a catalyst A [bis(η5-cyclopentadienyl)titanium (tetrahydrofurfuryloxy) chloride] (also referred to as "[chlorobis(2,4-cyclopentadienyl)titanium(IV) tetrahydrofurfuryl alkoxide]"). Incidentally, the yield was 95%.

Production Example 2

Catalyst B

A three-neck flask having a volume of 1 L, equipped with a stirrer and a dropping funnel, was subjected to replacement with dry nitrogen and 200 ml of anhydrous tetrahydrofuran and 0.2 mol of furfuryl alcohol were added thereto. Thereafter, an n-BuLi/cyclohexane solution (0.2 mol) was added dropwise into the three-neck flask at 15° C. to perform a reaction, thereby obtaining a tetrahydrofuran solution of furfuryloxylithium.

Then, a three-neck flask having a volume of 1 L, equipped with a stirrer and a dropping funnel, was subjected to replacement with dry nitrogen and 49.8 g (0.2 mol) of bis(η5-cyclopentadienyl)titanium dichloride and 250 ml of anhydrous tetrahydrofuran were added thereto. The tetrahydrofuran solution of furfuryloxylithium obtained by the above-described method was added dropwise thereto over a period of about 1 hour at room temperature under stirring. After about 2 hours, a reddish brown solution was filtrated and an undissolved portion was washed with dichloromethane.

Thereafter, the filtrate and the washing solution were combined and the solvents were removed under reduced pressure, thereby obtaining a catalyst B [bis(η5-cyclopentadienyl)titanium (furfuryloxy) chloride] (also referred to as "[chlorobis(2,4-cyclopentadienyl)titanium(IV) furfuryl alkoxide]"). Incidentally, the yield was 97%.

Example 1

[Synthesis of Conjugated Diene Rubber C and Evaluation Thereof]

Into an autoclave reactor having an internal volume of 10 liters which had been subjected to replacement with nitrogen, 5,000 g of cyclohexane, 75.0 g of tetrahydrofuran, 250 g of styrene, and 730 g of 1,3-butadiene were charged. After adjusting the temperature of contents in the reactor to 10° C., a cyclohexane solution containing n-butyllithium (11.60 mmol) was added thereto to initiate polymerization. The polymerization was conducted under adiabatic conditions, and the maximum temperature reached 85° C.

At the time when the polymerization conversion reached 99%, 20 g of butadiene was additionally added and the polymerization was further conducted for 5 minutes to obtain a reaction solution containing a polymer. Then, 8.5 g of N,N-bis(trimethylsilyl)aminopropylmethyldiethoxysilane was added and reacted with an active point of the polymer for 30 minutes.

Subsequently, the reaction solution was heated to 80° C. or higher and hydrogen was introduced into the system.

Then, 0.73 g of the catalyst B, 1.16 g of diethylaluminum chloride, and 0.27 g of n-butyllithium were added thereto and the whole was reacted so as to maintain a hydrogen pressure of 1.0 MPa. After attainment of a predetermined hydrogen integrated flow rate, the reaction solution was returned to ordinary temperature and ordinary pressure and extracted from the reaction vessel to obtain a polymer solution.

Subsequently, an aqueous solution (temperature: 80° C.) whose pH had been adjusted to pH 8.5 (pH at 80° C. by a glass electrode method, the same shall apply hereinafter) with ammonia as a pH adjuster was placed in a solvent removing tank, the above polymer solution was further added thereto (a ratio of 200 parts by mass of the aqueous solution relative to 100 parts by mass of the polymer solution), solvent removal was performed at a temperature of the liquid phase of the solvent removing tank: 95° C. by steam stripping (steam temperature: 190° C.) of 2 hours, and drying was performed by a hot roll whose temperature was controlled to 110° C., thereby obtaining a conjugated diene rubber C.

Table 1 shows the polymerization formula of the conjugated diene rubber C and Table 2 shows properties of the resulting conjugated diene rubber C. Furthermore, using the conjugated diene rubber C, the rubber composition prepared by the compounding formulation shown in Table 3 was vulcanized and physical property evaluation was performed. Table 4 shows results thereof.

Example 2

[Synthesis of Conjugated Diene Rubber D and Evaluation Thereof]

Into an autoclave reactor having an internal volume of 10 liters which had been subjected to replacement with nitrogen, 5,000 g of cyclohexane, 75.0 g of tetrahydrofuran, and 100 g of isoprene were charged. After adjusting the temperature of contents in the reactor to 10° C., a cyclohexane solution containing n-butyllithium (11.60 mmol) was added thereto to initiate polymerization. The polymerization was conducted under adiabatic conditions, and the maximum temperature reached 25° C.

Then, 250 g of styrene and 630 g of 1,3-butadiene were additionally added and polymerization was performed. The polymerization was conducted under adiabatic conditions, and the maximum temperature reached 80° C.

At the time when the polymerization conversion reached 99%, 20 g of butadiene was additionally added and the polymerization was further conducted for 5 minutes to obtain a reaction solution containing a polymer. Then, 8.5 g of N,N-bis(trimethylsilyl)aminopropylmethyldiethoxysilane was added and reacted with an active point of the polymer for 30 minutes.

Subsequently, the reaction solution was heated to 80° C. or higher and hydrogen was introduced into the system.

Then, 0.73 g of the catalyst B, 1.16 g of diethylaluminum chloride, and 0.27 g of n-butyllithium were added thereto and the whole was reacted so as to maintain a hydrogen pressure of 1.0 MPa. After attainment of a predetermined hydrogen integrated flow rate, the reaction solution was returned to ordinary temperature and ordinary pressure and extracted from the reaction vessel to obtain a polymer solution.

Subsequently, an aqueous solution (temperature: 80° C.) whose pH had been adjusted to pH 8.5 (pH at 80° C. by a glass electrode method, the same shall apply hereinafter) with ammonia as a pH adjuster was placed in a solvent removing tank, the above polymer solution was further added thereto (a ratio of 200 parts by mass of the aqueous solution relative to 100 parts by mass of the polymer solution), solvent removal was performed at a temperature of the liquid phase of the solvent removing tank: 95° C. by steam stripping (steam temperature: 190° C.) of 2 hours, and drying was performed by a hot roll whose temperature was controlled to 110° C., thereby obtaining a conjugated diene rubber D.

Table 1 shows the polymerization formula of the conjugated diene rubber D and Table 2 shows properties of the resulting conjugated diene rubber D. Furthermore, using the conjugated diene rubber D, the rubber composition prepared by the blending formulation shown in Table 3 was vulcanized and physical property evaluation was performed. Table 4 shows results thereof.

Example 3

[Synthesis of Conjugated Diene Rubber E and Evaluation Thereof]

Into an autoclave reactor having an internal volume of 10 liters which had been subjected to replacement with nitrogen, 5,000 g of cyclohexane, 0.6 g of tetrahydrofuran, and 100 g of isoprene were charged. After adjusting the temperature of contents in the reactor to 10° C., a cyclohexane solution containing n-butyllithium (11.60 mmol) was added thereto to initiate polymerization. The polymerization was conducted under adiabatic conditions, and the maximum temperature reached 25° C.

Then, after 74.4 g of tetrahydrofuran was added thereto, 250 g of styrene and 630 g of 1,3-butadiene were additionally added and polymerization was performed. The polymerization was conducted under adiabatic conditions, and the maximum temperature reached 80° C.

At the time when the polymerization conversion reached 99%, 20 g of butadiene was additionally added and the polymerization was further conducted for 5 minutes to obtain a reaction solution containing a polymer. Then, 8.5 g of N,N-bis(trimethylsilyl)aminopropylmethyldiethoxysilane was added and reacted with an active point of the polymer for 30 minutes.

Subsequently, the reaction solution was heated to 80° C. or higher and hydrogen was introduced into the system.

Then, 0.73 g of the catalyst B, 0.33 g of diethylaluminum chloride, and 0.18 g of tetrachlorosilane were added thereto and the whole was reacted so as to maintain a hydrogen pressure of 1.0 MPa. After attainment of a predetermined hydrogen integrated flow rate, the reaction solution was returned to ordinary temperature and ordinary pressure and extracted from the reaction vessel to obtain a polymer solution.

Subsequently, an aqueous solution (temperature: 80° C.) whose pH had been adjusted to pH 8.5 (pH at 80° C. by a glass electrode method, the same shall apply hereinafter) with ammonia as a pH adjuster was placed in a solvent removing tank, the above polymer solution was further added thereto (a ratio of 200 parts by mass of the aqueous solution relative to 100 parts by mass of the polymer solution), solvent removal was performed at a temperature of the liquid phase of the solvent removing tank: 95° C. by steam stripping (steam temperature: 190° C.) of 2 hours, and drying was performed by a hot roll whose temperature was controlled to 110° C., thereby obtaining a conjugated diene rubber E.

Table 1 shows the polymerization formula of the conjugated diene rubber E and Table 2 shows properties of the resulting conjugated diene rubber E. Furthermore, using the conjugated diene rubber E, the rubber composition prepared by the blending formulation shown in Table 3 was vulcanized and physical property evaluation was performed. Table 4 shows results thereof.

Example 4

[Synthesis of Conjugated Diene Rubber X and Evaluation Thereof]

Into an autoclave reactor having an internal volume of 10 liters which had been subjected to replacement with nitrogen, 5,000 g of cyclohexane, 75.0 g of tetrahydrofuran, 250 g of styrene, and 730 g of 1,3-butadiene were charged. After adjusting the temperature of contents in the reactor to 10° C., a cyclohexane solution containing n-butyllithium (11.60 mmol) was added thereto to initiate polymerization. The polymerization was conducted under adiabatic conditions, and the maximum temperature reached 85° C.

At the time when the polymerization conversion reached 99%, 20 g of butadiene was additionally added and the polymerization was further conducted for 5 minutes to obtain a reaction solution containing a polymer. Then, 8.5 g of N,N-bis(trimethylsilyl)aminopropylmethyldiethoxysilane was added and reacted with an active point of the polymer for 30 minutes.

Subsequently, the reaction solution was heated to 80° C. or higher and hydrogen was introduced into the system.

Then, 0.73 g of the catalyst A, 1.16 g of diethylaluminum chloride, and 0.27 g of n-butyllithium were added thereto and the whole was reacted so as to maintain a hydrogen pressure of 1.0 MPa. After attainment of a predetermined hydrogen integrated flow rate, the reaction solution was returned to ordinary temperature and ordinary pressure and extracted from the reaction vessel to obtain a polymer solution.

Subsequently, an aqueous solution (temperature: 80° C.) whose pH had been adjusted to pH 8.5 (pH at 80° C. by a glass electrode method, the same shall apply hereinafter) with ammonia as a pH adjuster was placed in a solvent removing tank, the above polymer solution was further added thereto (a ratio of 200 parts by mass of the aqueous solution relative to 100 parts by mass of the polymer solution), solvent removal was performed at a temperature of the liquid phase of the solvent removing tank: 95° C. by steam stripping (steam temperature: 190° C.) of 2 hours, and drying was performed by a hot roll whose temperature was controlled to 110° C., thereby obtaining a conjugated diene rubber X.

Table 1 shows the polymerization formula of the conjugated diene rubber X and Table 2 shows properties of the resulting conjugated diene rubber X. Furthermore, using the conjugated diene rubber X, the rubber composition prepared by the blending formulation shown in Table 3 was vulcanized and physical property evaluation was performed. Table 4 shows results thereof.

Example 5

[Synthesis of Conjugated Diene Rubber Z and Evaluation Thereof]

Into an autoclave reactor having an internal volume of 10 liters which had been subjected to replacement with nitrogen, 5,000 g of cyclohexane, 75.0 g of tetrahydrofuran, 250 g of styrene, and 730 g of 1,3-butadiene were charged. After adjusting the temperature of contents in the reactor to 10° C., a cyclohexane solution containing n-butyllithium (11.60 mmol) was added thereto to initiate polymerization. The polymerization was conducted under adiabatic conditions, and the maximum temperature reached 85° C.

At the time when the polymerization conversion reached 99%, 20 g of butadiene was additionally added and the polymerization was further conducted for 5 minutes to obtain a reaction solution containing a polymer. Then, 8.5 g of N,N-bis(trimethylsilyl)aminopropylmethyldiethoxysilane was added and reacted with an active point of the polymer for 30 minutes.

Subsequently, the reaction solution was heated to 80° C. or higher and hydrogen was introduced into the system.

Then, 0.73 g of the catalyst B, 1.16 g of diethylaluminum chloride, and 0.27 g of n-butyllithium were added thereto and the whole was reacted so as to maintain a hydrogen pressure of 1.0 MPa. After attainment of a predetermined hydrogen integrated flow rate, the reaction solution was returned to ordinary temperature and ordinary pressure and extracted from the reaction vessel to obtain a polymer solution.

Subsequently, an aqueous solution (temperature: 80° C.) whose pH had been adjusted to pH 8.5 (pH at 80° C. by glass electrode method, the same shall apply hereinafter) with ammonia as a pH adjuster was placed in a solvent removing tank, the above polymer solution was further added thereto (a ratio of 200 parts by mass of the aqueous solution relative to 100 parts by mass of the polymer solution), solvent removal was performed at a temperature of the liquid phase of the solvent removing tank: 95° C. by steam stripping (steam temperature: 190° C.) of 2 hours, and drying was performed by a hot roll whose temperature was controlled to 110° C., thereby obtaining a conjugated diene rubber Z.

Table 1 shows the polymerization formula of the conjugated diene rubber Z and Table 2 shows properties of the resulting conjugated diene rubber Z. Furthermore, using the conjugated diene rubber Z, the rubber composition prepared by the blending formulation shown in Table 3 was vulcanized and physical property evaluation was performed. Table 4 shows results thereof.

Comparative Example 1

[Synthesis of Conjugated Diene Rubber S and Evaluation Thereof]

Into an autoclave reactor having an internal volume of 5 liters which had been subjected to replacement with nitrogen, 2,750 g of cyclohexane, 50.0 g of tetrahydrofuran, 125 g of styrene, and 365 g of 1,3-butadiene were charged. After adjusting the temperature of contents in the reactor to 10° C., a cyclohexane solution containing n-butyllithium (5.80 mmol) was added thereto to initiate polymerization. The polymerization was conducted under adiabatic conditions, and the maximum temperature reached 85° C.

At the time when the polymerization conversion reached 99%, 10 g of butadiene was additionally added and the polymerization was further conducted for 5 minutes. Then, 2.0 g of 2,6-di-tert-butyl-p-cresol was added to the resulting polymer solution. Subsequently, solvent removal was performed by steam stripping using hot water which has been adjusted to pH=9 with sodium hydroxide and a rubber was dried by a hot roll whose temperature was controlled to 110° C., thereby obtaining a conjugated diene rubber S.

Table 1 shows the polymerization formula of the conjugated diene rubber S and Table 2 shows properties of the resulting conjugated diene rubber S. Furthermore, using the modified conjugated diene rubber S, the rubber composition prepared by the blending formulation shown in Table 3 was vulcanized and physical property evaluation was performed. Table 4 shows results thereof.

Comparative Example 2

[Synthesis of Conjugated Diene Rubber T and Evaluation Thereof]

Into an autoclave reactor having an internal volume of 5 liters which had been subjected to replacement with nitrogen, 5,000 g of cyclohexane, 75.0 g of tetrahydrofuran, and 30 g of styrene were charged. After adjusting the temperature of contents in the reactor to 10° C., a cyclohexane solution containing n-butyllithium (11.6 mmol) was added thereto to initiate polymerization. The polymerization was conducted under adiabatic conditions, and the maximum temperature reached 15° C.

Then, 190 g of styrene and 730 g of 1,3-butadiene were additionally added and polymerization was performed. The polymerization was conducted under adiabatic conditions, and the maximum temperature reached 80° C.

At the time when the polymerization conversion reached 99%, 30 g of styrene was additionally added and the polymerization was further conducted for 10 minutes. Then, 20 g of 1,3-butadiene was additionally added and the polymerization was further conducted for 5 minutes to obtain a reaction solution containing a polymer.

Subsequently, the reaction solution was heated to 80° C. or higher and hydrogen was introduced into the system.

Then, 0.73 g of the catalyst B, 0.33 g of diethylaluminum chloride, and 0.18 g of tetrachlorosilane were added thereto and the whole was reacted so as to maintain a hydrogen pressure of 1.0 MPa. After attainment of a predetermined hydrogen integrated flow rate, the reaction solution was returned to ordinary temperature and ordinary pressure and extracted from the reaction vessel to obtain a polymer solution.

Subsequently, an aqueous solution (temperature: 80° C.) whose pH had been adjusted to pH 8.5 (pH at 80° C. by a glass electrode method, the same shall apply hereinafter) with ammonia as a pH adjuster was placed in a solvent removing tank, the above polymer solution was further added thereto (a ratio of 200 parts by mass of the aqueous solution relative to 100 parts by mass of the polymer solution), solvent removal was performed at a temperature of the liquid phase of the solvent removing tank: 95° C. by steam stripping (steam temperature: 190° C.) of 2 hours, and drying was performed by a hot roll whose temperature was controlled to 110° C., thereby obtaining a conjugated diene rubber T.

Table 1 shows the polymerization formula of the conjugated diene rubber T and Table 2 shows properties of the resulting conjugated diene rubber T. Furthermore, using the conjugated diene rubber T, the rubber composition prepared by the blending formulation shown in Table 3 was vulcanized and physical property evaluation was performed. Table 4 shows results thereof.

Comparative Example 3

[Synthesis of Conjugated Diene Rubber Y and Evaluation Thereof]

Into an autoclave reactor having an internal volume of 10 liters which had been subjected to replacement with nitrogen, 5,000 g of cyclohexane, 75.0 g of tetrahydrofuran, 250 g of styrene, and 730 g of 1,3-butadiene were charged. After adjusting the temperature of contents in the reactor to 10° C., a cyclohexane solution containing n-butyllithium (11.60 mmol) was added thereto to initiate polymerization. The polymerization was conducted under adiabatic conditions, and the maximum temperature reached 85° C.

At the time when the polymerization conversion reached 99%, 20 g of butadiene was additionally added and the polymerization was further conducted for 5 minutes to obtain a reaction solution containing a polymer.

Subsequently, the reaction solution was heated to 80° C. or higher and hydrogen was introduced into the system.

Then, 0.73 g of the catalyst B, 0.33 g of diethylaluminum chloride, and 0.18 g of tetrachlorosilane were added thereto and the whole was reacted so as to maintain a hydrogen pressure of 1.0 MPa. After attainment of a predetermined hydrogen integrated flow rate, the reaction solution was returned to ordinary temperature and ordinary pressure and extracted from the reaction vessel to obtain a polymer solution.

Subsequently, an aqueous solution (temperature: 80° C.) whose pH had been adjusted to pH 8.5 (pH at 80° C. by a glass electrode method, the same shall apply hereinafter) with ammonia as a pH adjuster was placed in a solvent removing tank, the above polymer solution was further added thereto (a ratio of 200 parts by mass of the aqueous solution relative to 100 parts by mass of the polymer solution), solvent removal was performed at a temperature of the liquid phase of the solvent removing tank: 95° C. by steam stripping (steam temperature: 190° C.) of 2 hours, and drying was performed by a hot roll whose temperature was controlled to 110° C., thereby obtaining a conjugated diene rubber Y.

Table 1 shows the polymerization formula of the conjugated diene rubber Y and Table 2 shows properties of the resulting conjugated diene rubber Y. Furthermore, using the conjugated diene rubber Y, the rubber composition prepared by the blending formulation shown in Table 3 was vulcanized and physical property evaluation was performed. Table 4 shows results thereof.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Kind of modified conjugated diene polymer |  | C | D | E | X | Z | S | T | Y |
| Polymerization formulation |  |  |  |  |  |  |  |  |  |
| Solvent |  |  |  |  |  |  |  |  |  |
| cyclohexane | (g) | 5000 | 5000 | 5000 | 5000 | 5000 | 2750 | 5000 | 5000 |
| Vinyl content adjuster |  |  |  |  |  |  |  |  |  |
| tetrahydrofuran | (g) | 75.0 | 75.0 | 75.0 | 75.0 | 75.0 | 50.0 | 75.0 | 75.0 |
| Polymerization monomer |  |  |  |  |  |  |  |  |  |
| isoprene | (g) | — | 100 | 100 | — | — | — | — | — |
| styrene | (g) | 250 | 250 | 250 | 250 | 250 | 125 | 250 | 250 |
| butadiene | (g) | 730 | 630 | 630 | 730 | 730 | 365 | 730 | 730 |
| additionally added butadiene | (g) | 20 | 20 | 20 | 20 | 20 | 10 | 20 | 20 |
| Polymerization initiator |  |  |  |  |  |  |  |  |  |
| n-butyllithium | (mmol) | 11.60 | 11.60 | 11.60 | 11.60 | 11.60 | 5.80 | 11.60 | 11.60 |
| Amine-based modifier |  |  |  |  |  |  |  |  |  |
| N—Si-1 | *1 (g) | 8.5 | 8.5 | 8.5 | 8.5 | 8.5 | — | — | — |

*1: N,N-bis(triethylsilyl)aminopropylmethyldiethoxysilane

TABLE 2

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Kind of modified conjugated diene polymer |  | C | D | E | X | Z | S | T | Y |
| [Properties of modified conjugated diene rubber] |  |  |  |  |  |  |  |  |  |
| Bonded styrene content | (% by mass) | 25 | 24 | 24 | 25 | 24 | 25 | 25 | 24 |
| Ratio of styrene long chain | (% by mass) | 2.8 | 3.6 | 3.5 | 2.8 | 2.8 | 2.7 | 28 | 2.8 |
| Vinyl content | (%) | 55 | 55 | 55 | 55 | 55 | 56 | 56 | 55 |
| Weight-average molecular weight (×$10^4$) |  | 20 | 19 | 19 | 20 | 19 | 20 | 20 | 19 |
| Hydrogenation rate of structural unit derived from BD | (%) | 95 | 98 | 98 | 85 | 60 | 0 | 96 | 95 |
| Mooney viscosity (ML1 + 4, 100° C.) |  | 67 | 63 | 60 | 47 | 40 | 20 | 88 | 67 |

TABLE 3

| Blending formulation (phr) | |
|---|---|
| Modified conjugated diene polymer | 100 |
| Silica *1) | 70 |
| Silane coupling agent *2) | 5.6 |
| Stearic acid | 2.0 |
| Antiaging agent *3) | 1.0 |
| Zinc oxide | 3.0 |
| Vulcanizing accelerator CZ *4) | 1.8 |
| Vulcanizing accelerator D *5) | 1.5 |
| Sulfur | 1.5 |

*1) Nipsil AQ manufactured by Tosoh Silica Corporation
*2) Si69 manufactured by Evonik Industries AG
*3) Nocrac 810NA manufactured by Ouchi Shinko Chemical Industrial Co., Ltd.
*4) Nocceler CZ manufactured by Ouchi Shinko Chemical Industrial Co., Ltd.
*5) Nocceler D manufactured by Ouchi Shinko Chemical Industrial Co., Ltd.

[Kneading of Rubber Composition and Characteristic Evaluation]

Using a plastomill (inner capacity: 250 cc) fitted with a temperature-controlling device, as first-stage kneading, a conjugated diene rubber, silica, a silane coupling agent, stearic acid, an antiaging agent, and zinc white were kneaded under the conditions of a filling rate of 72% and a rotational number of 60 rpm. Then, as second-stage kneading, after cooling of the blend obtained above to room temperature, sulfur and a vulcanization accelerator were kneaded. This was molded and then vulcanized in a vulcanization press at 160° C. for a predetermined time and the following characteristic evaluation showing the following tire performance was performed.

(i) Mooney viscosity: It was measured using an L rotor under conditions of preheating for 1 minutes, a rotor operating time of 4 minutes, and a temperature of 100° C. in accordance with JIS K6300-1:2013, using a rubber composition before vulcanization as a measurement sample.

(ii) Tensile strength: 300% Modulus was measured in accordance with JIS K6251:2010. The value is indicated as an index and a larger numerical value means larger and better tensile strength.

(iii) 0° C. tan δ: It was measured under the conditions of a tensile dynamic strain of 0.14%, an angular velocity of 100 radians per second, and 0° C. using a dynamic spectrometer (manufactured by Rheometrics of US), using a vulcanized rubber as a measurement sample. The value is indicated as an index and a larger numerical value means larger and better wet skid resistance.

(iv) 70° C. tan δ: It was measured under the conditions of a tensile dynamic strain of 0.7%, an angular velocity of 100 radians per second, and 70° C. using a dynamic spectrometer (manufactured by Rheometrics of US), using a vulcanized rubber as a measurement sample. The value is indicated as an index and a larger numerical value means smaller and better low hysteresis loss properties.

(v) Abrasion resistance: It was measured at 25° C. with a load of 10 N in accordance with JIS K6264-2:2005 using a DIN abrasion tester (manufactured by Toyo Seiki Co., Ltd.), using a vulcanized rubber as a measurement sample. The value is indicated as an index and a larger numerical value means better abrasion resistance.

As is apparent from Table 4, it is realized that tensile strength and abrasion resistance are improved in the polymer compositions using the hydrogenated conjugated diene rubbers C, D, E, X, and Z without impairing the balance between the wet skid resistance and low hysteresis loss properties.

TABLE 4

| | | Example 1 | Example 2 | Example 3 | Example 4 | Example 5 | Comparative Example 1 | Comparative Example 2 | Comparative Example 3 |
|---|---|---|---|---|---|---|---|---|---|
| Kind of modified conjugated diene polymer | | C | D | E | X | Z | S | T | Y |
| [Physical properties of crosslinked rubber composition] | | | | | | | | | |
| Tensile strength | (index) | 182 | 192 | 200 | 148 | 108 | 100 | 110 | 125 |
| 0° C. tan δ | (index) | 102 | 104 | 103 | 102 | 103 | 100 | 95 | 101 |
| 70° C. tan δ | (index) | 124 | 128 | 134 | 126 | 128 | 100 | 86 | 98 |
| Abrasion resistance | (index) | 128 | 137 | 137 | 118 | 102 | 100 | 93 | 110 |

INDUSTRIAL APPLICABILITY

The present invention can be suitably used for tires.

The invention claimed is:

1. A tire member obtained by subjecting a composition comprising a hydrogenated conjugated diene polymer and a crosslinking agent to a crosslinking treatment,
    wherein the hydrogenated conjugated diene polymer is a hydrogenated product of a conjugated diene polymer which comprises: a structural unit derived from butadiene; a structural unit derived from styrene; and a functional group attached at one end or both ends of the conjugated diene polymer, the functional group being one or more groups selected from the group consisting of an amino group, an imino group, a pyridyl group, a phosphino group, a thiol group, and a hydrocarbyloxysilyl group; and
    wherein the hydrogenation rate of the structural unit derived from butadiene of the hydrogenated conjugated diene polymer is 90% or more.

2. The tire member according to claim 1, wherein the hydrogenated conjugated diene polymer comprises a structure represented by the following general formula (1-1) as a structure containing the functional group at the end(s):

(1-1)

wherein $A^4$ is a functional group which has one or more atoms selected from the group consisting of N, P, and S and in which a part or all of the one or more atoms are optionally protected with a hydrocarbylsiliy group and the atom bonding to $R^5$ is N, P, or S; $R^3$ is a hydrocarbyl group and n is 0 to 2; $R^5$ is a hydrocarbylene group; $R^6$ is a hydrogen atom or a hydrocarbyl group; and $R^3$'s and $R^6$'s existing in plurality are each the same or different.

3. The tire member according to claim 1, wherein, in the hydrogenated conjugated diene polymer, a chain composed of the structural units derived from styrene ranging in an amount of 8 or more units is contained in a ratio of 10% by mass or less relative to the whole of the structural units derived from styrene.

4. The tire member according to claim 1, wherein the hydrogenated conjugated diene polymer comprises a structural unit derived from a conjugated diene compound other than butadiene.

5. The tire member according to claim 4, wherein the conjugated diene compound other than butadiene is isoprene.

6. The tire member according to claim 1, wherein the hydrogenated conjugated diene polymer is a hydrogenated product of a polymer obtained by polymerizing monomers including 50 to 90 parts by mass of butadiene, 10 to 50 parts by mass of styrene, and 0 to 40 parts by mass of a conjugated diene compound other than butadiene.

7. The tire member according to claim 1, wherein 1,2-vinyl content in the structural unit derived from butadiene in the conjugated diene polymer obtained by polymerizing monomer(s) including butadiene is from 5 to 70%.

8. The tire member according to claim 1, wherein the hydrogenated conjugated diene polymer comprises a polyisoprene block.

9. The tire member according to claim 8, wherein the ratio of 1,4-bond/3,4-bond of the polyisoprene block ranges from 60/40 to 98/2.

10. The tire member according to claim 1, wherein the composition further comprises one or more selected from silica and carbon black.

11. The tire member according to claim 1, wherein the tire member is a tread.

12. The tire member according to claim 1, wherein the tire member is a side wall.

13. A hydrogenated conjugated diene polymer, which is a hydrogenated product of a conjugated diene polymer, comprising: a polymer block which comprises a structural unit derived from butadiene and a structural unit derived from styrene; a polyisoprene block at one end or both end of the polymer block; and a functional group attached at one end or both ends of the polymer chain of the conjugated diene polymer, the functional group being at least one group selected from the group consisting of an amino group, an imino group, a pyridyl group, a phosphino group, a thiol group, and a hydrocarbyloxysilyl group;

wherein the hydrogenation rate of the structural unit derived from butadiene of the hydrogenated conjugated diene polymer is 90% or more.

14. The hydrogenated conjugated diene polymer according to claim 13, wherein the hydrogenated conjugated diene polymer comprises a structure represented by the following general formula (1-1) as a structure containing the functional group at the end(s) of the polymer chain:

wherein $A^4$ is a functional group which has one or more atoms selected from the group consisting of N, P, and S and in which a part or all of the one or more atoms are optionally protected with a hydrocarbylsiliy group and the atom bonding to $R^5$ is N, P, or S; $R^3$ is a hydrocarbyl group and n is 0 to 2; $R^5$ is a hydrocarbylene group; $R^6$ is a hydrogen atom or a hydrocarbyl group; and $R^3$'s and $R^6$'s existing in plurality are each the same or different.

15. The hydrogenated conjugated diene polymer according to claim 13, wherein a chain composed of the structural units derived from styrene ranging in an amount of 8 or more units is contained in a ratio of 10% by mass or less relative to the whole of the structural units derived from styrene.

16. The hydrogenated conjugated diene polymer according to claim 13, wherein the hydrogenated conjugated diene polymer is a hydrogenated product of a polymer obtained by polymerizing monomers including 50 to 90 parts by mass of butadiene, 10 to 50 parts by mass of styrene, and 0 to 40 parts by mass of a conjugated diene compound other than butadiene.

17. The hydrogenated conjugated diene polymer according to claim 13, wherein 1,2-vinyl content in the structural unit derived from butadiene in the conjugated diene polymer obtained by polymerizing monomer(s) including butadiene is from 5 to 70%.

18. The hydrogenated conjugated diene polymer according to claim 13, wherein the ratio of 1,4-bond/3,4-bond of the polyisoprene block is from 60/40 to 98/2.

19. A polymer composition for tire member formation, comprising: the hydrogenated conjugated diene polymer according to claim 13; and a crosslinking agent.

20. The tire member according to claim 1, wherein conjugated diene polymer comprises a polymer block which comprises the structural unit derived from butadiene and the structural unit derived from styrene, and further comprises a polyisoprene block at one end or both end of the polymer block.

* * * * *

UNITED STATES PATENT AND TRADEMARK OFFICE
CERTIFICATE OF CORRECTION

PATENT NO.       : 10,125,211 B2
APPLICATION NO.  : 14/762681
DATED            : November 13, 2018
INVENTOR(S)      : Naoya Nosaka et al.

Page 1 of 1

It is certified that error appears in the above-identified patent and that said Letters Patent is hereby corrected as shown below:

In the Claims

Column 23, Line 4, Claim 2, "hydrocarbylsiliy" should read -- hydrocarbylsilyl --.

Column 24, Line 21, Claim 14, "hydrocarbylsiliy" should read -- hydrocarbylsilyl --.

Signed and Sealed this
Eleventh Day of June, 2019

Andrei Iancu
*Director of the United States Patent and Trademark Office*